United States Patent [19]

Hill

[11] Patent Number: 5,702,237

[45] Date of Patent: Dec. 30, 1997

[54] IN TANK FUEL PUMP FILTER

[75] Inventor: Gerald A. Hill, Cass City, Mich.

[73] Assignee: Walbro Corporation, Cass City, Mich.

[21] Appl. No.: 552,799

[22] Filed: Nov. 3, 1995

[51] Int. Cl.[6] ............................................. F04B 23/00
[52] U.S. Cl. ................................................ 417/313; 210/168
[58] Field of Search ........................... 447/313; 210/168, 210/335, 416.5, 486, 491

[56] References Cited

U.S. PATENT DOCUMENTS

| | | | |
|---|---|---|---|
| 2,134,061 | 10/1938 | Thomas | 210/168 |
| 5,263,459 | 11/1993 | Talaski | 123/516 |
| 5,407,562 | 4/1995 | Baldino | 210/335 |

*Primary Examiner*—Timothy Thorpe
*Assistant Examiner*—Samantha H. Moon
*Attorney, Agent, or Firm*—Barnes, Kisselle, Raisch, Choate, Whittemore & Hulbert

[57] ABSTRACT

A fuel filter for the inlet of a fuel pump having upper and lower wall portions each constructed of a material with a plurality of openings. The lower wall portion has a greater total thickness and/or a smaller average opening size than the upper wall portion to provide more effective filtration of the fuel drawn into the fuel pump through the lower wall of the filter. The filter also causes a greater resistance to fuel flow through the lower wall thereby increasing the rate of fuel drawn through the upper wall of the filter.

13 Claims, 2 Drawing Sheets

IN TANK FUEL PUMP FILTER

FIELD OF THE INVENTION

This invention relates to fuel delivery systems for internal combustion engines and more particularly to a filter for a fuel pump inlet.

BACKGROUND OF THE INVENTION

U.S. Pat. No. 5,263,459 discloses a fuel delivery system for internal combustion engines that has a fuel pump within a fuel tank. The fuel pump draws fuel from the tank and delivers the fuel, under pressure, to the engine. A filter is placed at the fuel pump inlet to trap contaminants and prevent them from entering the fuel pump.

The fuel filters previously used for this application have been ineffective at preventing some contaminants, such as weld splatter, from entering the fuel pump. Weld splatter and other such contaminants can damage a fuel pump and decrease the durability and performance of the pump if allowed to pass through the filter and into the pump.

Generally, weld splatter and similar contaminants tend to remain at the bottom of the tank and thus, the fuel drawn from the bottom of the tank tends to have more contaminants therein than fuel drawn from above the bottom of the tank. Hence, fuel from the bottom of the tank must be thoroughly filtered to avoid damage to the fuel pump.

Previous filters have been designed with uniform filter material at the top and bottom walls of the filter. This design causes the pump to draw and filter the fuel substantially equally through the upper and lower walls of the filter. While these filters are usually satisfactory for the fuel drawn in through the upper wall, they have been ineffective at trapping the contaminants in the fuel near the bottom of the fuel tank which are generally drawn through the lower wall of the filter.

SUMMARY OF THE INVENTION

For a fuel pump, a fuel filter disposed adjacent the bottom of a fuel tank to draw fuel through both upper and lower wall portions of filter material with the lower portion providing more thorough filtration than the upper portion. In the preferred embodiment, the lower wall portion is constructed of one or more layers of filter material such that the lower wall has a greater thickness than the upper wall. In another embodiment of the invention, the filter material of the bottom wall has smaller openings, through which the fuel is drawn, than the openings of the filter material of the top wall.

This filter also has a higher rate of fuel flow through the top portion than the bottom portion which decreases the likelihood of pump contamination by drawing more fuel tending to have fewer contaminants. In use as the lower portion becomes more plugged with contaminants this tendency increases and even if the bottom portion becomes completely plugged the pump can still draw fuel through the upper portion to adequately supply fuel to the engine, until an extremely low fuel level is reached in the tank. Even under this "plugged" lower portion condition the fuel pump will not be damaged because any harmful contaminants will remain at the bottom of the tank and hence not be drawn through the upper portion of the filter.

Objects, features and advantages of this invention are to provide a fuel filter that improves the filtration of the contaminants in a fuel tank to prevent the contaminants from entering a fuel pump, has a greater rate of fuel flow through the top of the filter than the bottom of the filter, provides increased filtration of the fuel which is drawn through the bottom of the filter, increases the reliability and the durability of the fuel pump, and is of relatively simple design, economical manufacture and assembly and has a long, useful life in service.

DESCRIPTION OF THE DRAWINGS

These and other objects, features and advantages of this invention will be apparent from the following detailed description of the preferred embodiments and best mode, appended claims, and accompanying drawings in which:

DETAILED DESCRIPTION OF THE PREFERRED EMBODIMENTS

Figure 1:
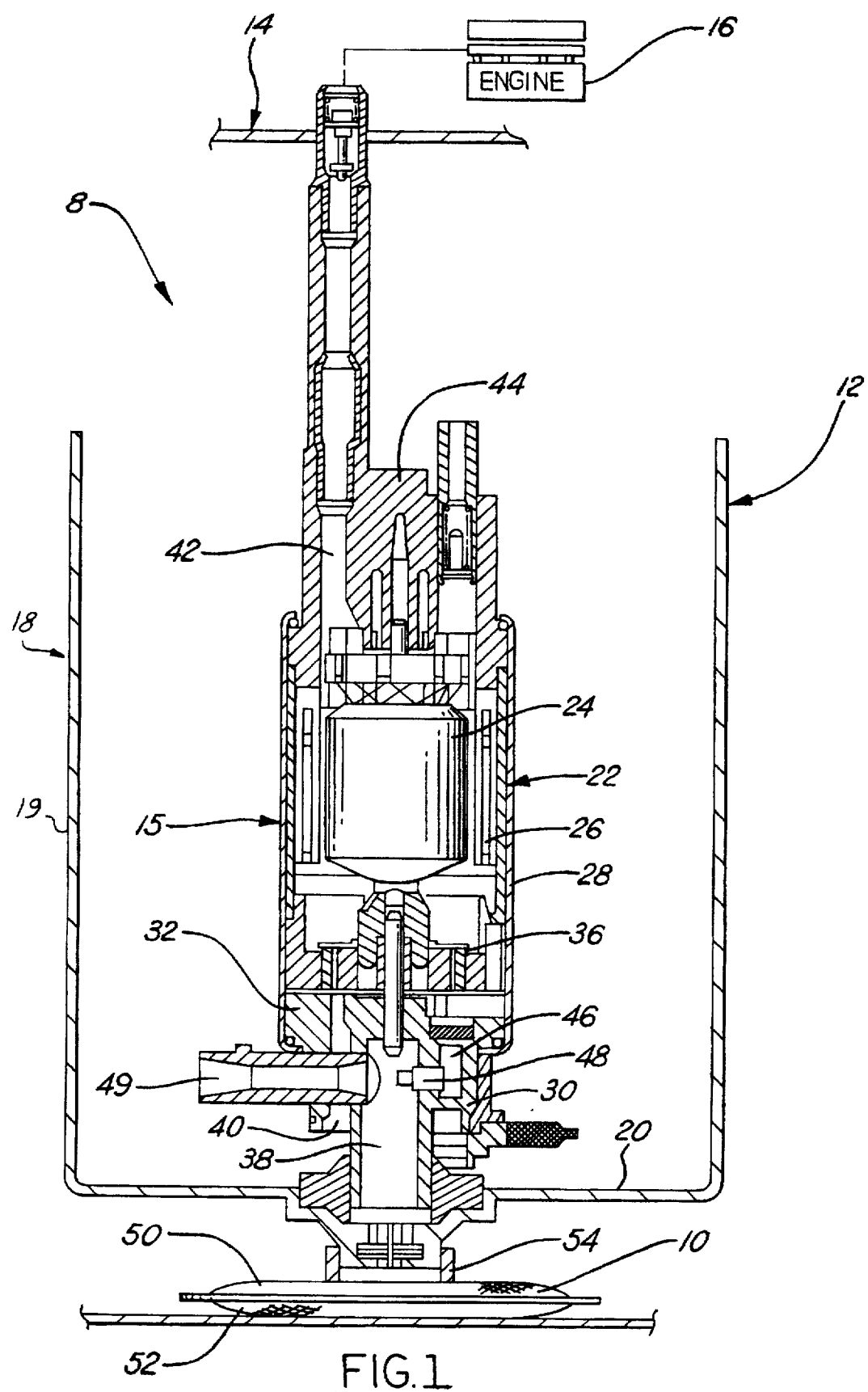
FIG. 1 is a sectional view of a fuel delivery system embodying this invention.

FIG. 1 illustrates a fuel delivery system 8 with a fuel filter 10 embodying the invention of a fuel pump module 12 disposed within a fuel tank 14 with an electric pump 15 for delivering fuel under pressure from the tank 14 to an internal combustion engine 16. The pump 15 is received in a canister 18 with a generally cylindrical side wall 19 and a bottom wall 20 adjacent to the bottom of the fuel tank 14. The pump 15 has an electric motor 22 with an armature 24 and a surrounding stator 26 disposed within a generally cylindrical housing or case 28. A pump inlet 30 projects through the canister wall 20 from a lower end cap 32 of the pump to receive fuel from the surrounding tank 14 through the filter 10. The armature 24 is coupled to a rotary gear pumping mechanism 36 for drawing fuel through an inlet passage 40 from within the canister 18, and delivering fuel under pressure through the interior of the housing 28 to an outlet passage 42 in the upper pump end cap 44. A secondary pump outlet 46 feeds a lesser quantity of fuel under pressure to a nozzle 48 which is aligned with a venturi passage 49 for aspirating fuel through the filter 10 into the interior of the canister 18.

In operation, when the pump 15 is energized, it draws fuel from the canister 18 and delivers it to the engine 16. A secondary pump outlet 46 discharges a portion of the fuel to the nozzle 48 which discharges the fuel through the venturi passage 49. This fuel flow through the venturi passage 49 creates a drop in pressure across the venturi passage 49 and a fuel pump inlet conduit 38 which causes fuel to be drawn through the filter 10 whereupon it is expelled into the canister 18.

The pump module 12 as thus far described is disclosed in U.S. Pat. No. 5,263,459 the disclosure of which is incorporated herein by reference and hence, will not be described in further detail.

The fuel filter 10 has spaced apart and confronting upper and lower walls 50, 52 connected to each other about their peripheries to form a bag-shaped filter with an interior cavity 56. To allow the filter 10 to be easily attached to the inlet housing 30 of the fuel pump 15, preferably, the filter 10 has a tubular attachment neck 54 that is attached to the upper wall 50 of the fuel filter 10 so that it communicates with the interior cavity 56 of the filter through an opening 58 in the upper wall. The neck 54 receives the end of the inlet module 30 that extends into the fuel tank 14 to attach the filter 10 to the fuel inlet of the pump 15.

To increase the filtration of fuel drawn through the lower wall of the filter 10 and to increase the resistance to fuel flow through the lower wall of the filter, preferably the lower wall portion of the filter 10 has a greater thickness and/or has a smaller average opening size than the upper wall of the filter 50.

Figure 2:
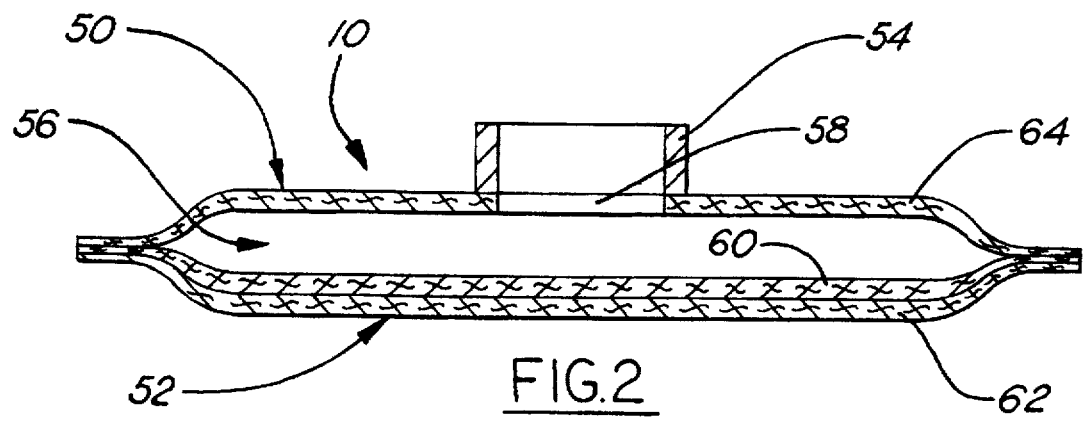
FIG. 2 is a cross-sectional view of one embodiment of this invention with the lower wall of the filter having two layers of filter material.

In one embodiment of the filter 10, as shown in FIG. 2, the lower wall 52 is constructed of two layers 60, 62 of filter material and the upper wall 50 is constructed of one layer 64 of the same filter material so that the lower wall 52 is effectively twice as thick as the upper wall 50. Each layer of filter material has a plurality of openings or pores with an average size of less than 100 microns, desirably less than 80 microns and preferably 60–70 microns.

Figure 3:
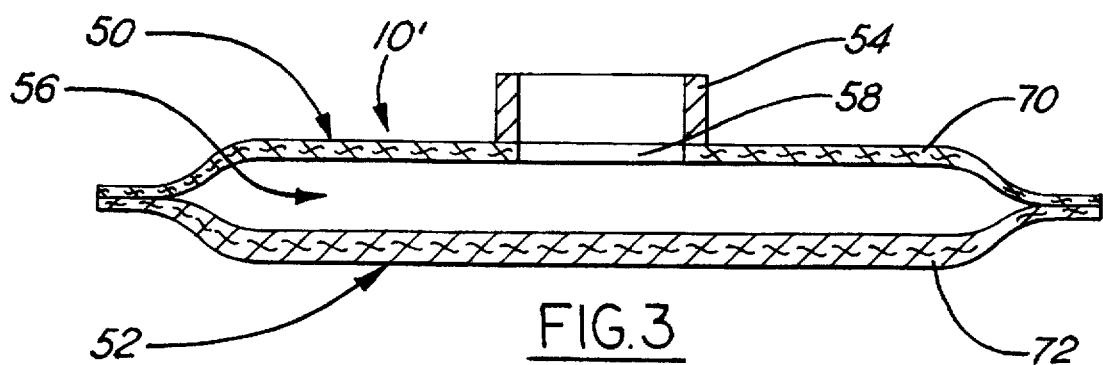
FIG. 3 is a cross-sectional view of another embodiment of this invention with the lower wall of the filter having one layer of filter material with a greater thickness than the upper wall of the filter.

In another embodiment, as shown in FIG. 3, the filter 10' has upper and lower walls each constructed of a single layer 70, 72 of filter material with the layer of the lower wall 72 having a thickness at least 1.5 times the thickness of the material 70 of the upper wall. Preferably, the layer of the lower wall is at least twice as thick as the layer of the upper wall. Each layer of filter material has a plurality of openings with an average size of less than 100 microns desirably less than 80 microns and preferably 60–70 microns.

Figure 4:
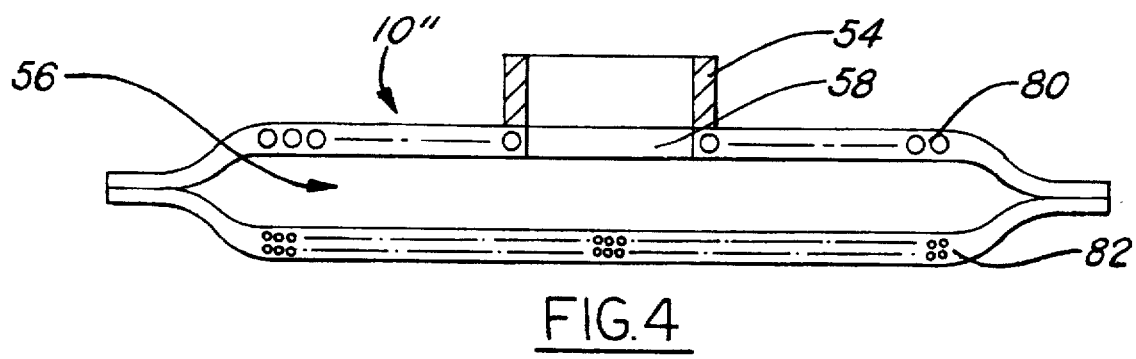
FIG. 4 is a cross-sectional view of a further embodiment of this invention with the lower wall of the filter material having a smaller average opening size than that of the material of the upper wall of the filter.

In still another embodiment, as shown in FIG. 4, the filter 10" has upper and lower walls each with a single layer of filter material 80, 82 with the same nominal thickness and the average opening size of the lower layer 82 being substantially smaller than that of the upper layer 80. Typically, the average opening size of the lower layer is about one half of that of the upper layer. The average opening size of the upper layer is less than 100 microns, desirably less than 80 microns and preferably about 60–70 microns. The average opening size of the lower layer 82 is less than 60 microns, desirably less than 50 microns and preferably about 30–40 microns.

For all embodiments of the filter preferably the filter material is a melt blown resin or plastic material such as nylon or polyester.

In use, the fuel filter 10, 10' or 10" is attached to the inlet of a fuel pump module 12 and disposed at the bottom or lowest portion of the tank 14 to prevent the larger fuel contaminants from entering and thereby potentially damaging the fuel pump 15. Since the more harmful contaminants tend to be near the bottom of the fuel tank the filter provides increased filtration of the fuel drawn from the bottom of the tank and it also draws more fuel from above the bottom of the tank, where there are generally less contaminants.

By constructing the fuel filter with a thicker bottom wall or with a bottom wall that has smaller openings or pores, the fuel drawn from the bottom of the fuel tank is more thoroughly filtered than fuel drawn from above the bottom of the tank. Also, in the preferred embodiments the lower wall of the filter causes an increased resistance to fuel flow through the lower wall. This increased resistance causes more fuel, and generally cleaner fuel, to be drawn through the upper wall of the filter. In use, this tendency to draw more fuel through the top of the filter increases as the lower wall of the filter becomes more plugged with contaminants. Indeed, even if the lower wall becomes completely plugged, the pump can still draw enough fuel through the top of the filter to adequately supply fuel to the engine, until an extremely low fuel level is reached in the tank. Thus, the filter improves filtration of fuel drawn into a fuel pump by causing less fuel to be drawn from the bottom of the fuel tank and by providing increased filtration of that fuel which is drawn from the bottom of the fuel tank.

I claim:

1. A fuel delivery system for an internal combustion engine comprising; a fuel pump constructed and arranged to be disposed in a fuel tank with a pump inlet disposed at a lower portion of the tank for drawing fuel therefrom and a pump outlet for delivering fuel under pressure to the engine, and a fuel filter immediately adjacent the bottom of the tank through which fuel from the fuel tank is drawn into said fuel pump, said fuel filter having spaced apart upper and lower wall portions at least in part defining an interior cavity between them communicating with the pump inlet and each constructed of a material with a plurality of openings and having an average opening size not greater than about 100 microns and the lower wall portion has at least one of an average opening size not greater than about 60 microns or an average thickness of the lower wall portion which is at least 1.5 of the average thickness of the upper wall portions and in assembly in the fuel tank the lower wall with said lower wall portion located immediately adjacent the bottom of the fuel tank, the upper wall portion spaced above it, and the lower wall portion providing a finer filtration and a greater resistance to fuel flow than the upper wall portion so that in operation of the fuel pump, a greater proportion of cleaner fuel from the tank flows through the upper wall portion of the filter and the dirtier fuel flowing through the lower wall portion of the filter is more finely and completely filtered than the fuel flowing through the upper wall portion.

2. The filter of claim 1 wherein both upper and lower wall portions of the filter are constructed of one layer of filter material and the average opening size in the filter material of the lower wall portion is not greater than one half of the average opening size of the filter material of the upper wall portion of the fuel filter.

3. The filter of claim 1 wherein the material of the lower wall portion of the filter has an average opening size of less than 50 microns and the material of the upper wall portion of the filter has an average opening size of less than 80 microns.

4. The filter of claim 1 wherein the material of the lower wall portion has an average opening size in the range of 30–40 microns and the material of the upper wall portion of the filter has an average opening size in the range of 60–70 microns.

5. The filter of claim 1 wherein said upper wall portion is a single layer of filter material and said lower wall portion is a single layer of filter material which has a thickness of at least 1.5 of the thickness of the single layer of filter material of said upper wall portion.

6. The filter of claim 1 wherein said lower wall portion of the filter is constructed of at least two layers of filter material each having an average thickness and the total of the average thicknesses of all the layers of the lower wall portion is at least 1.5 of the total average thickness of the upper wall portion.

7. The filter of claim 1 wherein the upper and lower wall portions of the filter are melt blown materials.

8. The filter of claim 1 wherein the upper and lower wall portions of the filter are woven materials.

9. The filter of claim 3 wherein the upper and lower wall portions of the filter are melt blown materials.

10. The filter of claim 1 wherein the upper wall portion is a single layer of a woven material and the lower wall portion is a melt blown material.

11. A fuel delivery system for an internal combustion engine comprising; a fuel pump constructed to be disposed in a fuel tank with a pump inlet disposed at a lower portion of the tank for drawing fuel therefrom and a pump outlet for delivering fuel under pressure to the engine, and a fuel filter through which fuel from the fuel tank is drawn into said fuel pump, said fuel filter having spaced apart upper and lower wall portions at least in part defining an interior cavity between them communicating with the pump inlet and each constructed of a material with a plurality of openings, the upper wall portion has at least one layer of filter material having an average opening size not greater than about 100 microns and the lower wall portion has one of a group consisting essentially of at least one layer of filter material with an average opening size substantially smaller than the average opening size in the upper wall portion, and at least one layer of filter material with the total thickness of the lower wall portion being at least 1.5 greater than the total thickness of the upper wall portion, and with said lower wall portion located immediately adjacent the bottom of the fuel tank, the upper wall portion spaced above it, and the lower wall portion providing a finer filtration and a greater resistance to fuel flow than the upper wall portion so that in operation of the fuel pump, a greater proportion of cleaner fuel from the tank flows through the upper wall portion of the filter and the dirtier fuel flowing through the lower wall portion of the filter is more finely and completely filtered than the fuel flowing through the upper wall portion.

12. A fuel delivery system for an internal combustion engine comprising; a fuel pump constructed to be disposed in a fuel tank with a pump inlet disposed at a lower portion of the tank for drawing fuel therefrom and a pump outlet for delivering fuel under pressure to the engine, and a fuel filter immediately adjacent the bottom of the tank through which feel from the fuel tank is drawn into said fuel pump, said fuel filter having upper and lower wall portions at least in part defining an interior cavity between them communicating with the pump inlet and each constructed of a filter material with a plurality of openings, the filter material of the lower wall portion having an average opening size not greater than about one-half of the average opening size of the filter material of the upper wall portion of the fuel filter, and with said lower wall portion located immediately adjacent the bottom of the fuel tank, the upper wall portion spaced above it, and the lower wall portion providing a finer filtration and a greater resistance to fuel flow than the upper wall portion so that in operation of the fuel pump, a greater proportion of cleaner fuel from the tank flows through the upper wall portion of the filter and the dirtier fuel flowing through the lower wall portion of the filter is more finely and completely filtered than the fuel flowing through the upper wall portion.

13. A fuel delivery system for an internal combustion engine comprising; a fuel pump constructed to be disposed in a fuel tank with a pump inlet disposed at a lower portion of the tank for drawing fuel therefrom and a pump outlet for delivering fuel under pressure to the engine, and a fuel filter immediately adjacent the bottom of the tank through which fuel from the fuel tank is drawn into said fuel pump, said fuel filter having upper and lower wall portions at least in part defining an interior cavity between them communicating with the pump inlet and each constructed of a material with a plurality of openings, the lower wall portion having a total thickness that is greater than the total thickness of the upper wall portion, and with said lower wall portion located immediately adjacent the bottom of the fuel tank, the upper wall portion spaced above it, and the lower wall portion providing a finer filtration and a greater resistance to fuel flow than the upper wall portion so that in operation of the fuel pump, a greater proportion of cleaner fuel from the tank flows through the upper wall portion of the filter and the dirtier fuel flowing through the lower wall portion of the filter is more finely and completely filtered than the fuel flowing through the upper wall portion.

* * * * *

UNITED STATES PATENT AND TRADEMARK OFFICE
CERTIFICATE OF CORRECTION

PATENT NO. : 5,702,237
DATED : December 30, 1997
INVENTOR(S) : Gerald A. Hill

It is certified that error appears in the above-indentified patent and that said Letters Patent is hereby corrected as shown below:

Col 4, Line 25, change "portions" to "portion".

Col 4, Line 26, delete "in assembly in the fuel tank the lower wall".

Signed and Sealed this

Twenty-eighth Day of July, 1998

Attest:

BRUCE LEHMAN

Attesting Officer     Commissioner of Patents and Trademarks